United States Patent

Freedman

[15] 3,694,806

[45] Sept. 26, 1972

[54] CHARACTER RECOGNITION SYSTEM

[72] Inventor: Morris D. Freedman, Southfield, Mich.

[73] Assignee: The Bendix Corporation

[22] Filed: Aug. 20, 1970

[21] Appl. No.: 65,555

[52] U.S. Cl. ..................340/146.3 F, 340/146.3 MA

[51] Int. Cl. ..............................................G06k 9/12

[58] Field of Search..................................340/146.3

[56] References Cited

UNITED STATES PATENTS

| | | | |
|---|---|---|---|
| 3,284,772 | 11/1966 | Stewart | 340/146.3 F |
| 3,274,581 | 9/1966 | Moore et al. | 340/146.3 AH |
| 3,275,985 | 9/1966 | Dunn et al. | 340/146.3 S |
| 3,496,542 | 2/1970 | Rabinow | 340/146.3 MD |
| 3,534,334 | 10/1970 | Bartz et al. | 340/146.3 AG |
| 3,484,747 | 12/1969 | Nunley | 340/146.3 MD |
| 3,408,458 | 10/1968 | Hennis | 340/146.3 AH |
| 3,176,271 | 3/1965 | Mader | 340/146.3 |

OTHER PUBLICATIONS

Johnston, D. L.; " Beam Position Storage," Vol. 9, No. 5, Oct. 1966, pp. 474, 475, IBM Technical Disclosure Bulletin.

*Primary Examiner*—Thomas A. Robinson
*Assistant Examiner*—William W. Cochran
*Attorney*—Fisher and Schmidt, William F. Thornton and Plante, Hartz, Smith and Thompson

[57] ABSTRACT

A character recognition system utilizing an image dissector device to first develop an electronic image of a character and then to scan and to dissect the character into elemental areas. From this scan and dissect operation multiple analog signals are developed which simultaneously correspond to several of the elemental areas. Threshold circuits serve as quantizers and digitize the analog signals into digital signals with discrete levels representing black and white. These digital signals are supplied to logic circuitry which detects geometric features and encodes them as feature vectors. This vector information is stored in a computer memory along with the positional information for locating the vector. The positional information is derived from the scan driving circuitry. Classification and readout is subsequently made. In another embodiment, comparators are used for comparing the contrast between the elemental areas and developing outputs to be supplied to the logic circuitry.

14 Claims, 10 Drawing Figures

INVENTOR.
Morris D. Freedman

BY

Fisher & Schmidt
ATTORNEYS

INVENTOR.
Morris D. Freedman
BY
Fisher & Schmidt
ATTORNEYS

CHARACTER RECOGNITION SYSTEM

This invention relates to improvements in character recognition systems.

Character or pattern recognition systems generally first develop an optical image of a character and then convert the image into a point by point digital representation. This representation is processed in a sequential fashion to ultimately develop some kind of an acceptable readout. This multiple step process requires complex circuitry including intermediate memories and is incapable of operating in real time. Therefore, the system's operation is both time-consuming and costly and, of course, the equipment is expensive. Quantization is a problem too particularly when there is a need to discern between large areas of different contrast which may or may not be well defined.

With the foregoing in mind, a new and different character recognition system is contemplated where image points are processed in parallel.

Also contemplated is character recognition system wherein an electronic image of a character is scanned and its features extracted in a single operation.

Somewhat more specifically contemplated is a character recognition system that processes image points in parallel and simultaneously extracts features as vectors, provides their location, and then classifies these vectors.

Further objectives include the provision of a unique character recognition system that dissects an electronic image into elemental areas and develops these into analog equivalents which are easily and quickly processed for character recognition purposes with a minimum of simple circuitry and in real time; that in a single operation dissects an electronic image into elemental areas and develops several of these simultaneously into equivalents which are digitized to develop discrete logic levels for use in feature detection logic circuitry; that dissects an electronic image into elemental areas and develops several of these simultaneously into analog equivalents which through the agency of comparators are converted to levels for use in feature detection logic circuitry; that during the scan the feature detection logic circuitry encodes detected features as vectors which specify feature type and can be stored or classified; and that can accommodate large variations in contrast as well as distortion and skew in the input image.

The foregoing and other objects and advantages of the invention will become apparent from the following description and from the accompanying drawings in which:

FIG. 10 illustrates the FIG. 1 system scanning a character which is shown as an upper case letter U.

Figure 1:
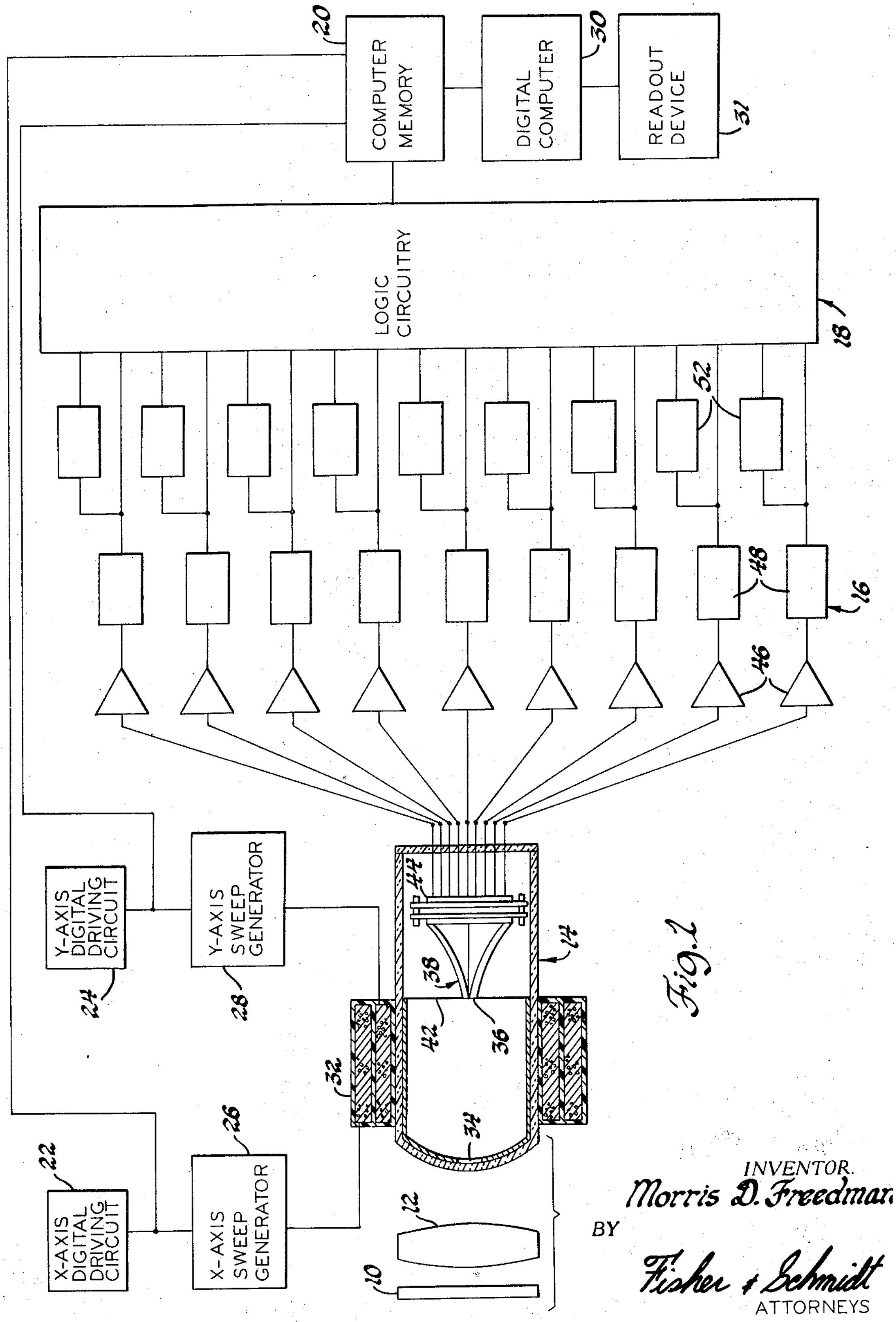
FIG. 1 is a schematic diagram of a character recognition system incorporating the principles of the invention.

Referring now to the details of the drawings and first to FIG. 1, the system depicts at 10 a sheet of paper or the like which will have characters and features or some form of pattern to be read. A suitable lens system 12 with the proper optical properties for the particular application of the system develops and transfers an optical image of the character to an image dissector device 14. The image dissector device 14 functions to generate an electronic image of the character and then analyzes it as will be explained. The analog signals from the image dissector device 14 are converted to digital signals by a digitizer, shown generally at 16. Thereafter, logic circuitry viewed generally at 18 extracts from these digital signals features and encodes these features by developing output feature vectors in logic units corresponding to the features. These output vectors are then stored in 20. Simultaneously, the position of the detected features is read into the computer memory 20 from X and Y digital driving circuits 22 and 24. These circuits 22 and 24 may be of any suitable type capable of also providing digital drive signals to generators 26 and 28. The generators 26 and 28 are of well known construction and generate in accordance with the digital drive signals appropriate analog voltages or currents for effecting the scanning by the image disector device 14. Hence, the instantaneous X and Y coordinates of a scan always correspond to the values of these digital drive signals. Subsequently, the stored information can be processed algorithmically by a digital computer 30 to determine what has been read; i.e., separate features into suitable sets which correspond to individual characters and classify these sets of features as to character type. The classified character can thereafter be reproduced by a readout device 31, such as a printer, a television type display or the like as a character or a series of characters.

Considering first the image dissector device 14, its function is to isolate for observation a small part of an electronic image and may be in various forms. For example, the illustrated BX750 Multisector Camera Tube, which is commercially available from The Bendix Corporation, can be used. This tube replaces the standard image dissector tube's electron multiplier with an array of Bendix Channeltron electron multipliers, which are shown and described in the Goodrich et al., U.S. Pat. No. 3,128,408.

Figure 2:
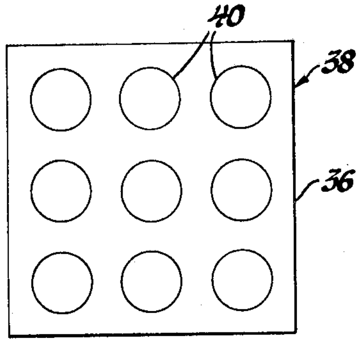
FIG. 2 is an enlarged end view of a cone multiplier which is incorporated in an image dissector device employed by the FIG. 1 system.
Figure 20:
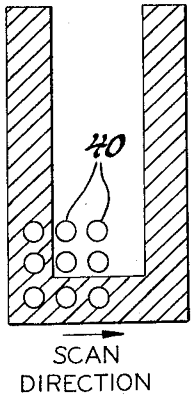

For demonstration purposes only, this device 14 is electrostatically focused and employs a magnetic deflection yoke 32 for generating the appropriate magnetic field so as to deflect the electronic image for scanning purposes. In the FIG. 1 system the deflection currents are derived from the X and Y axis sweep generators 26 and 28. A photocathode 34 converts the optical image from the lens system 12 to an electronic image. Electrons then emitted from the photocathode 34 are electrostatically focused onto an input end 36 of a multiple channel cone electron multiplier 38, which is the mentioned Bendix Channeltron electron multiplier. Again for demonstration purposes and without limitation this multiplier 38 has nine channel multipliers 40 arranged with the input end 36 at an opening in an aperture plate 42. As viewed in FIG. 2, the input end 36 has the individual multipliers 40 disposed in an orthogonal 3 × 3 matrix. Each multiplier 40 receives at its input aperture an electron current in proportion to the light intensity of an image element of the projected image. These channel multipliers 40 then multiply the current independently of each other. Nine separate anodes indicated generally at 44 collect these amplified currents as analog equivalents of the image elements.

By energizing the deflection yoke 32 to initiate the scan, the matrix of parallel channel multipliers 40 can receive electronic current from any part of the photocathode 34. Therefore, the device 14 can generate and render simultaneously available nine analog signals corresponding to nine adjacent image elements of the electronic image. In this way, at each instant of time during a scan logic can be performed not only on an image element at a particular location (X,Y) as determined by the deflection fields supplied by the deflection yoke 32 but also on its eight immediate neighbors. This permits neighborhood-logic feature detection to be carried out in real time during the scan.

Although a matrix of nine parallel multipliers 40 is illustrated, one should be mindful that more or less than nine can be used. This will be determined by the requirements of a particular character recognition system.

Figure 3:
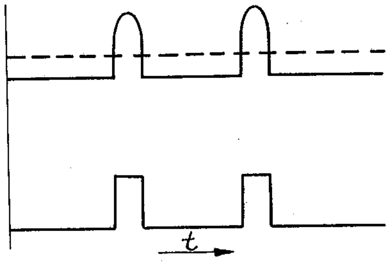
FIG. 3 is a voltage-time diagram depicting quantized outputs from the FIG. 1 image dissector device.

Continuing to refer to FIG. 1, the analog signals at the anodes 44 of the device 14 may if required each be strengthened by amplifiers 46. These analog signals next during a quantizing step are converted by the digitizer 16 to digital signals of discrete levels to represent black and white. This is shown in FIG. 3 where the upper pulses show the amplified analog signals and the lower pulses show the quantized digital signals. In the FIG. 1 system the white level is clamped to ground to establish a fixed threshold level which discriminates accurately between black type on a white background. This can be done by threshold circuits 48 of the voltage discriminator type so as to provide; e.g., logic 1 and logic 0 signals when black and white are respectively detected.

Figure 5:
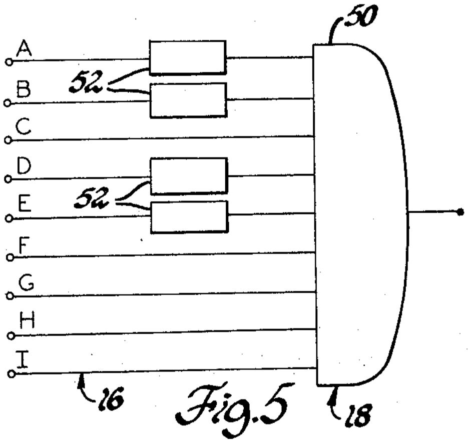
FIG. 5 shows schematically logic circuitry and the inputs thereto for detecting the FIG. 4 feature.

Next, these digital signals are processed by the logic circuitry 18 to extract the features, which are encoded as vectors of a specific feature type. The logic circuitry 18 utilizes a series of AND circuits 50, one for each feature. As depicted in FIG. 5, each AND circuit 50 has nine inputs. In operation, if all of an AND circuit's inputs are provided, for instance, with logic 1 signals to indicate that a particular feature has been detected, the AND circuit 50 will develop an output; e.g., a logic 1 signal reflecting this feature. If then there are, for exemplary purposes, 20 AND circuits 50, the logic circuitry 18 will develop an output or as it has been referred to a feature vector. This feature vector comprises one logic 1 signal or bit and 19 logic 0 signals or bits. It should be noted that subsequently the computer 30 when classifying features as characters considers this entire feature vector and recognizes that this logic 1 signal came from the AND circuit 50 detecting this feature. Hence, the feature vector advises what feature has been found.

Figure 4:
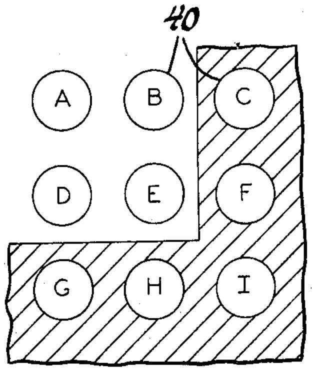
FIG. 4 shows the alignment of the FIG. 1 image dissector device's cone multiplier apertures with a lower right-hand corner of a character.

Because each of the AND circuits 50, only responds to one type of signal; i.e., logic 1 or logic 0 signals representing as suggested black and white respectively further processing is necessary. Therefore, each of the input digital signals is inverted by suitable inverter circuits 52. This renders always available both non-inverted and inverted signals at the input to the logic circuitry 18. To explain further reference is made to FIG. 4 along with FIG. 5. In FIG. 4 the nine individual multipliers 40 of the cone multiplier 38 have been individually designated by the capital letters A through I, inclusive. Their instantaneous disposition during a scan is shown aligned with a feature illustrated as a lower right-hand corner of a character. As can be observed the multipliers C, F, G, H and I all are positioned over the shaded or black portion of the character and the multipliers A, B, D and E are over the unshaded or white portion area. With this assumption then C, F, G, H and I sense elemental areas of the black portion and thus provide logic 1 signals. The multipliers A, B, D and E sense elemental areas of the white portion. Consequently they provide the logic 0 signals. The FIG. 5 circuit 50 is therefore connected to the digitizer 16 so that the inverted signals (logic 0 signals inverted to logic 1 signals) from the multipliers A, B, D and E are supplied to the indicated A, B, D and E inputs and the non-inverted signals (logic 1 signals) are supplied to the C, F, G, H and I inputs. The AND circuit 50 will now encode this lower right-hand corner feature as a logic 1 signal, which is part of the feature vector.

Figure 6:
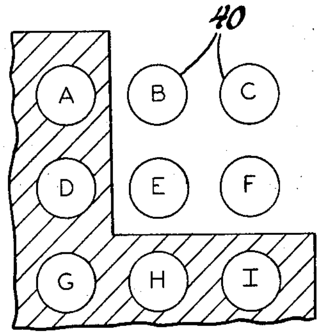
FIG. 6 illustrates the FIG. 1 image dissector device's cone multiplier with a lower left-hand corner of a character.

If the lower left-hand corner feature depicted in FIG. 6 is detected, then in accordance with the foregoing explanation the multipliers B, C, E and F will have their outputs inverted to logic 1 signals, whereas the multipliers A, D, G, H and I will not since they are positioned over the black portion of the character and will provide logic 1 signals.

Each of the other logic circuitry's AND circuits 50 will have all of their inputs supplied with the proper logic so as to respond and provide a logic 1 signal when detecting their respective feature. If the respective feature is not detected, there will be a logic 0 signal developed.

Figure 7:
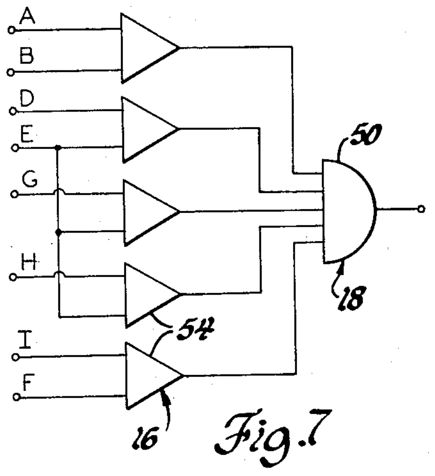
FIG. 7 shows another embodiment of the logic circuitry for detecting the FIG. 6 feature.

The FIG. 7 alternative has a different analog to digital convertor or digitizer, denoted by the numeral 16′. The digitizer 16′ utilizes a series of differential comparators 54 which may be differential amplifiers and threshold circuits having their inputs connected to the cone multiplier 38. If the contrast between the black and white portions of the character is sufficiently large to indicate a difference by a preset threshold, the comparators 54 will develop an output. The amplifiers 46 can also be included if required.

With reference to FIG. 6, and assuming the multipliers A through I are positioned to detect a lower left-hand corner as previously described, one of the logic circuitry's AND circuits 50 will have its inputs connected by individual comparators 54 to the indicated multipliers A through I. Since the comparators 54 with their inputs connected respectively to multipliers A and B; D and E; G and E; H and E; and I and F will each receive two signals; one representing the black portion and the other the white portion corresponding difference signals will be developed and supplied to the inputs of the AND circuit 50, which is set for the detection of the lower left-hand corner. The FIG. 7 AND circuit 50 will develop in the same way as described relative to FIG. 5 a logic 1 signal corresponding to this feature. This same general technique can be used for detection of various other features including the lower right-hand corner in FIG. 4.

In operation, the FIG. 1 system, whether it employs the FIG. 5 or FIG. 7 digitizer 16 or 16', while scanning an image develops the appropriate logic vectors and their locations for storage in the computer memory 20. If for exemplary purposes only, the image is assumed to be the upper case letter U in FIG. 10, the appropriate AND circuits 50 in the logic circuitry 18 will be energized indicating in the previously described way, the presence of the features which make up the upper case letter U. These features include the lower left-hand and right-hand corners, shown in FIGS. 6 and 4 respectively and thus these vectors and their X, Y coordinates will be supplied to the computer memory 20. When it is desired to classify features as characters, the information is transferred to the computer 30. The computer 30 which is programmed for making the classification, will process this vector and location information algorithmically and provide the appropriate output for driving the readout device 31 so as to indicate that an upper case letter U has been detected. One should be mindful that the FIG. 1 system comprehends scanning images with more than one character and thus locates features and stores where they are located in the memory 20. The computer 30 functions therefore to separate these collections of features and determines; for instance, that one of the features came from a certain character and that another of the features came from some other character.

Figure 8:
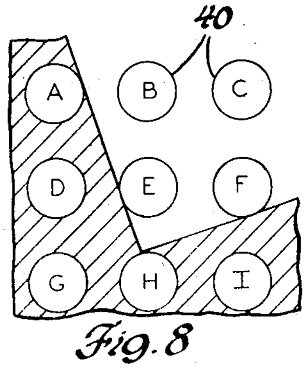
FIGS. 8 and 9 depict the detection by the FIG. 1 system of skewed and distorted corners respectively.
Figure 9:
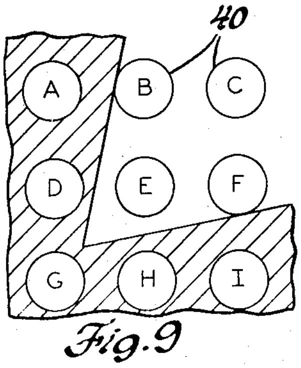

The fine scanning ability of the FIG. 1 system is best demonstrated by reference to FIGS. 8 and 9, where, as shown, the cone multiplier 38 will still respond and detect skewed corners as shown in FIG. 8 and distorted corners as shown in FIG. 9. The displacement and the diameter of the individual multipliers 40 and the size of the scan increments determines the extent of distortion or skew that can be detected. In a satisfactorily operating embodiment of the FIG. 1 system, the optical magnification of the lens system 12 was selected so that a typed capital letter was about 0.060 of an inch high. The aperture size of the 3 × 3 matrix of multipliers 40 was about 0.005 of an inch in diameter and the sweep deflection voltages were adjusted so that the increments between adjacent X and Y positions was about one-fifth the aperture size or about 0.001 of an inch.

At the same time that the feature vector is supplied to the memory 20, the X and Y axis digital driving circuits 22 and 24 provide X, Y position information to the memory 20 so that the feature vector location is determined. Also, the scanning and the feature extraction is done in a single operation because of the parallel processing capability of the image dissector device 14. The fine scanning by equivalently positioning the matrix of multipliers 40 in a sufficiently large number of adjacent positions to ensure a high probability of obtaining a match for each feature present, despite variations in position, intensity, and distortion, affords a simple solution to the "quantization error" problem. Further contributing to the efficiency of the FIG. 1 system is its ability to operate in real time while the input image is being scanned.

What is claimed is:

1. In a character recognition system, the combination of means generating and analyzing an electronic image of a character or characters, the generating and analyzing means, including an image dissector device having light sensitive means developing thereon the electronic image of the character or characters, means scanning the electronic image, and an array of parallel channel electron multipliers each having an input aperture positioned relative to the light sensitive means so as to receive electron current from the elemental areas of the image being scanned and anode means at the output thereof, the array being operative during the scanning to simultaneously and instantaneously develop at the outputs thereof a plurality of analog signals corresponding to elemental areas of the character and the adjacent environment of the character, means converting the plurality of analog signals to a corresponding set of digital signals, and logic means responsive to the digital signals and operative when the digital signals are supplied thereto in accordance with a predetermined scheme corresponding to certain features of the character to develop an output indicating that each of the certain features has been detected.

2. A character recognition system as described in claim 1, wherein the converting means includes quantizing means digitizing the analog signals into discrete logic levels corresponding to the character and to the environment adjacent to the character.

3. A character recognition system as described in claim 1, wherein the converting means includes a series of comparator circuits for converting the analog signals into digital signals when there is a predetermined relative contrast between the elements of a character and the adjacent environment.

4. A character recognition system as described in claim 1, wherein the converting means includes a series of inverter circuits one for inverting each digital signal and the logic means includes a series of AND circuits each corresponding to a certain feature to be detected and having certain inputs thereof connected to certain ones of the series of inverter circuits and certain other inputs thereof having the digital signals supplied thereto in accordance with the predetermined scheme so as to become operative when the certain feature is detected.

5. A character recognition system as described in claim 1, wherein the converting means includes a series of threshold circuits for digitizing the analog signals into discrete levels corresponding to the character and to the environment adjacent to the character and a series of inverter circuits one for inverting each digital signal and the logic means includes a series of AND circuits each corresponding to a certain feature to be detected and having the inputs thereof connected to certain ones of the series of inverter circuits and certain other inputs thereof connected directly to the threshold circuits in accordance with the predetermined scheme so as to develop an output when the certain feature is detected.

6. A character recognition system as described in claim 3, wherein the logic means includes an AND circuit having certain inputs thereof connected to the comparator circuits in accordance with the predetermined scheme so as to become operative when the certain feature is detected.

7. A character recognition system as described in claim 1, wherein the logic means includes an AND circuit having the inputs thereof supplied with digital signals in accordance with the predetermined scheme so as to become operative when the feature is detected.

8. A character recognition system as described in claim 1 and further including classifying means operative in response to the output from the logic means to classify the feature detected as to type.

9. In a character recognition system, the combination of means generating and analyzing an electronic image of a character or characters, the generating and analyzing means including an image dissector device having light sensitive means for developing the electronic image thereon, means scanning the electronic image, and an array of parallel channel electron multipliers, each having an input aperture positioned relative to the light sensitive means so as to receive electron current from the elemental areas of the image being scanned and anode means at the output thereof, the array being operative to simultaneously and instantaneously develop analog signals corresponding to the brightness of a certain matrix of elemental areas of the image, means converting the plurality of analog signals to a corresponding set of digital signals, logic means responsive to the digital signals and operative to develop an output representing certain features of the character when certain ones of the digital signals each have a predetermined logic state corresponding to the features, classifying means operative in response to the output from the logic means and also operated by the scanning means to classify each of the certain features detected as to type and location, and a readout device operated by the classifying means so as to provide character recognition information.

10. A character recognition system as described in claim 9, wherein the logic means includes a series of AND circuits each corresponding to one of the certain features to be detected and being operative when the inputs thereof are supplied with digital signals of one predetermined logic state to develop an output corresponding to the one of the certain features.

11. A character recognition system described in claim 9 further including memory means operatively connected between the logic means and the classifying means for storing the output from the logic means and wherein the scanning means includes X and Y axis sweep generating means for scanning the electronic image and X and Y axis digital means operatively associated with the X and Y axis sweep generating means for providing X and Y axis position signals during the scanning for supply to the memory means so as to locate the certain feature.

12. A character recognition system as described in claim 10 further including memory means operatively connected between the logic means and the classifying means for storing the output from the logic means and wherein the scanning includes X and Y axis sweep generating means for scanning the electronic image and X and Y axis digital means for driving the X and Y axis sweep generating means and also for simultaneously supplying X and Y axis position signals to the storage means so as to locate the certain feature.

13. In a character recognition system; the combination of image analyzing means including photo cathode means developing an electronic image of a character or characters to be analyzed, means scanning the electronic image including X and Y axis sweep generating means and X and Y axis digital means operative for driving the X and Y axis sweep generating means and also for simultaneously developing X and Y axis position signals during the scanning, and an array of parallel channel electron multipliers each having an aperture positioned relative to the photo cathode means so as to receive electron current from the elemental areas of the electronic image being scanned and anode means at the output thereof, the array being operative to simultaneously and instantaneously develop analog signals corresponding to the brightness of a certain matrix of elemental areas of the image; means converting the plurality of analog signals to a corresponding set of digital signals; the converting means including a series of threshold circuits for digitizing the analog signals into discrete levels corresponding to the character and to the environment adjacent to the character, and a series of inverter circuits, one for inverting each digital signal; logic means responsive to the digital signals and operative when the digital signals are supplied thereto in accordance with a predetermined scheme corresponding to a certain feature of the character to develop an output indicating the certain feature has been detected; the logic means including a series of AND circuits each corresponding to one of the certain features to be detected and having certain inputs thereof connected to certain ones of the series of inverter circuits and certain other inputs thereof connected directly to the threshold circuits in accordance with the predetermined scheme so as to develop the output indicating the certain feature has been detected; and classifying means operative in response to the output from the logic means, and also in response to the X AND Y axis digital means to classify the certain feature detected as to type and location.

14. A character recognition system as described in claim 13, and further including memory means operatively connected between the logic means and the classifying means and also operatively connected to the X and Y axis digital means for storing the output from the logic means and the X and Y axis position signals from the X and Y axis digital means; and a readout device operated by the classifying means so as to provide character recognition information.

* * * * *